Patented May 22, 1945

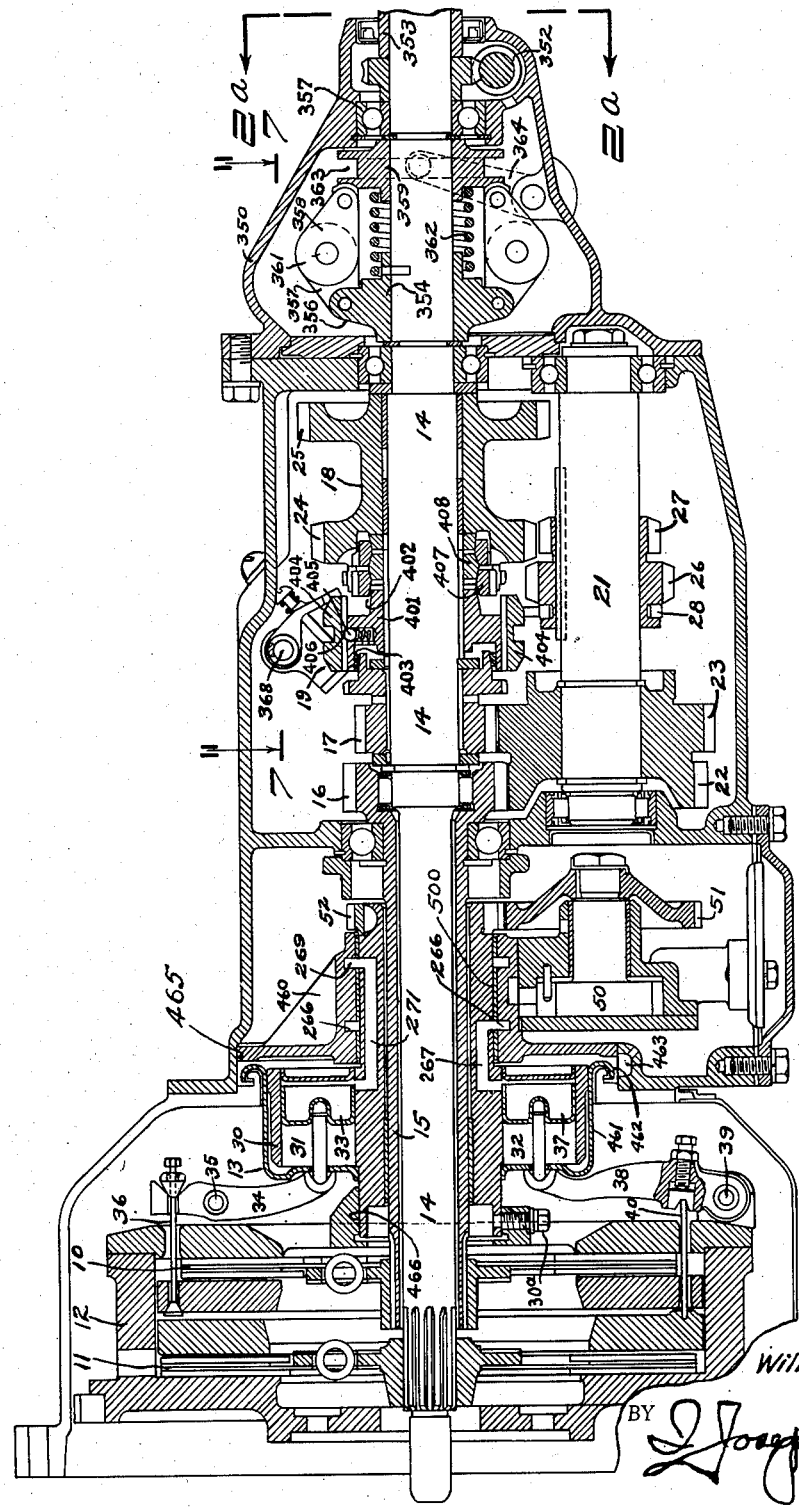

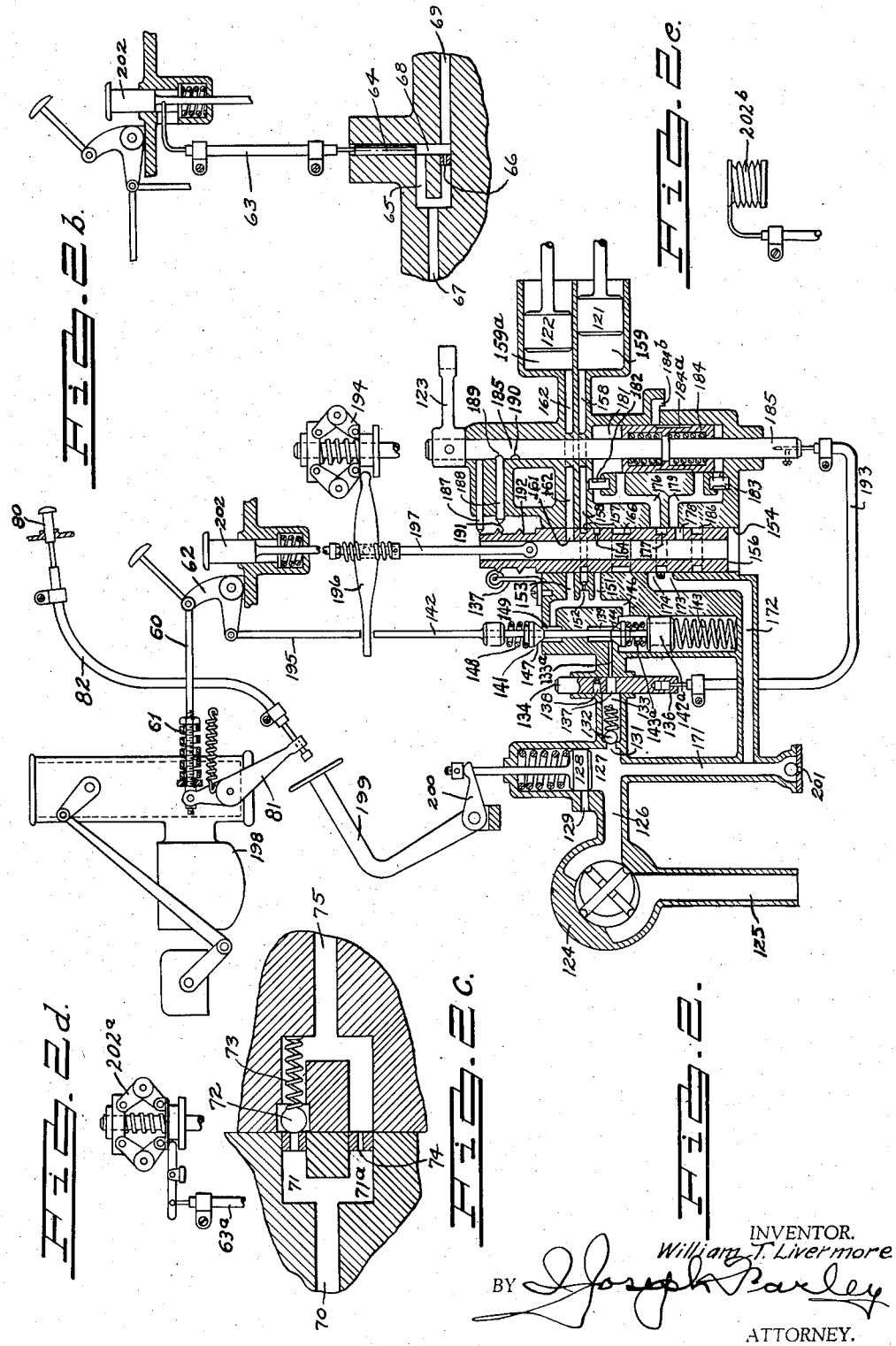

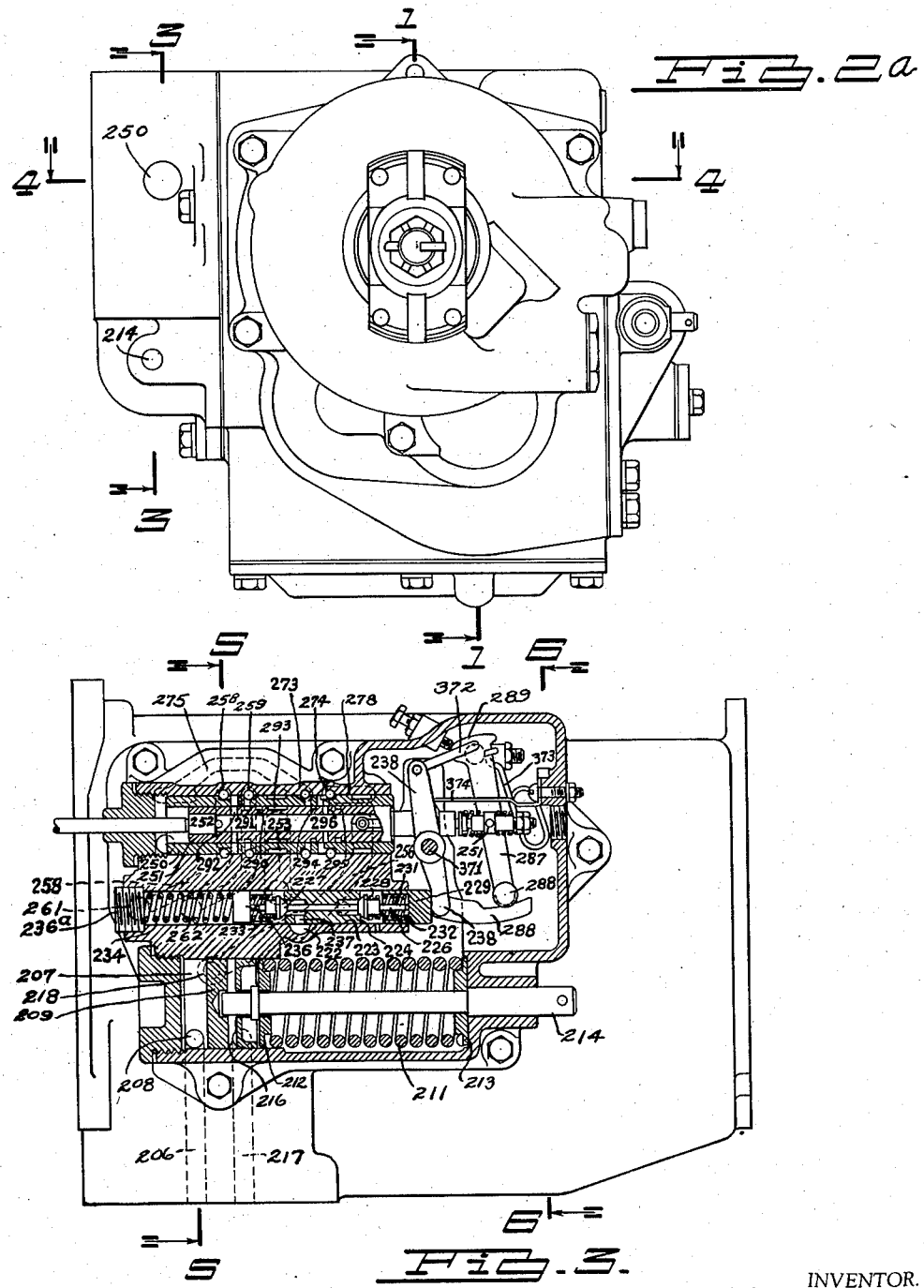

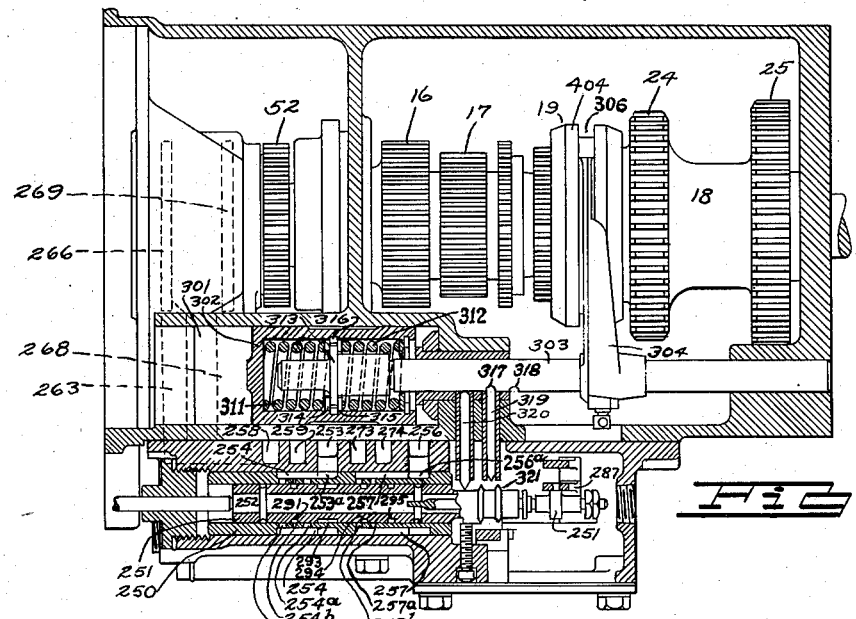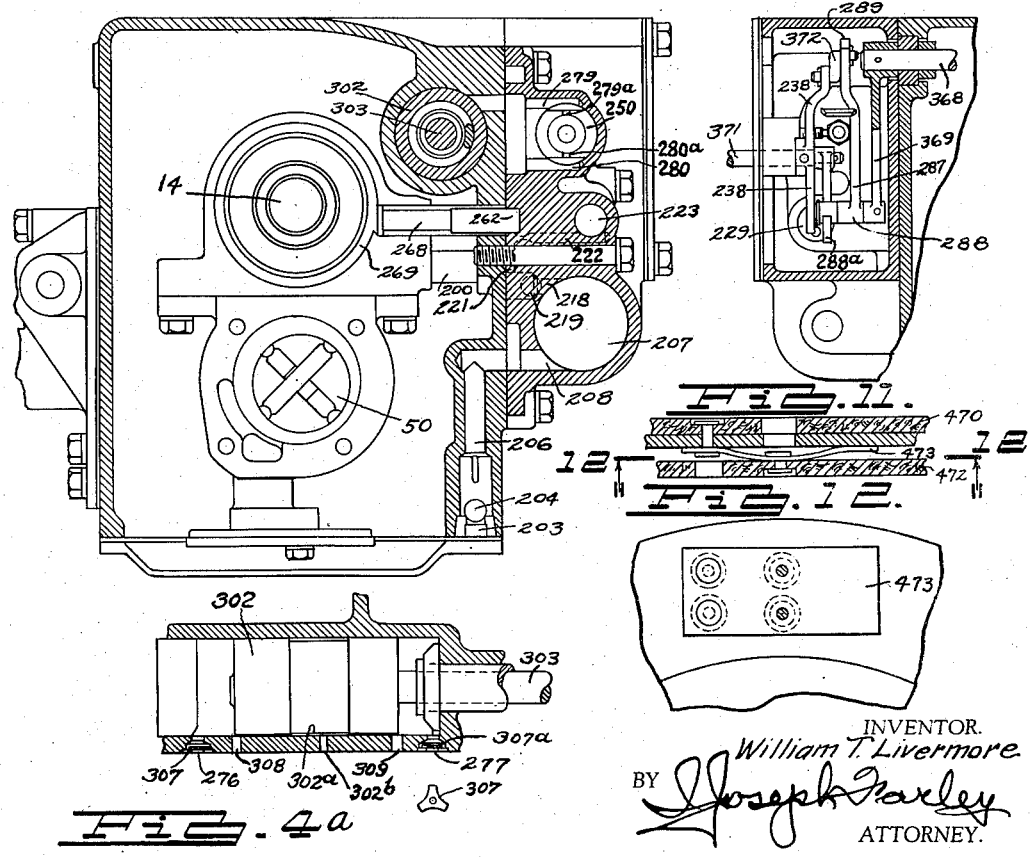

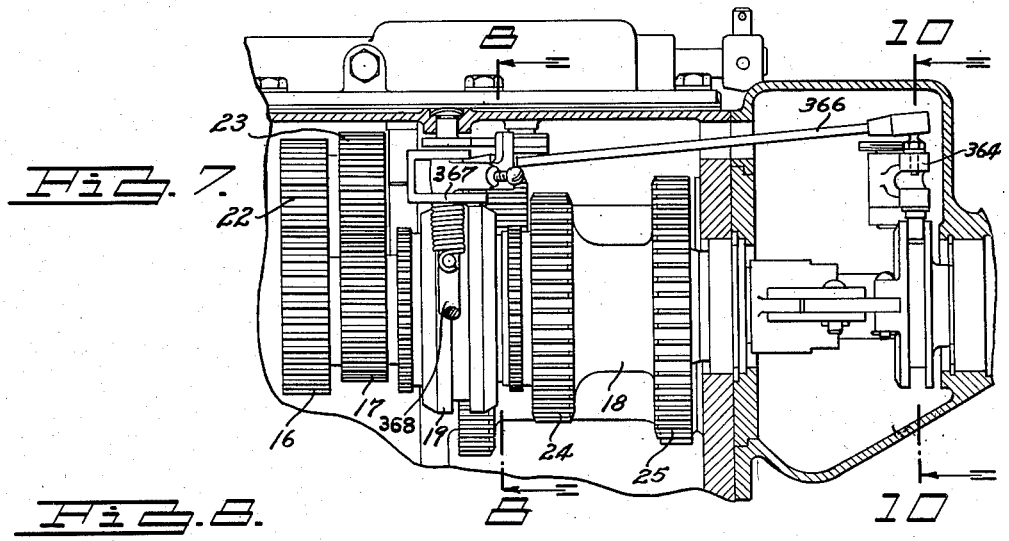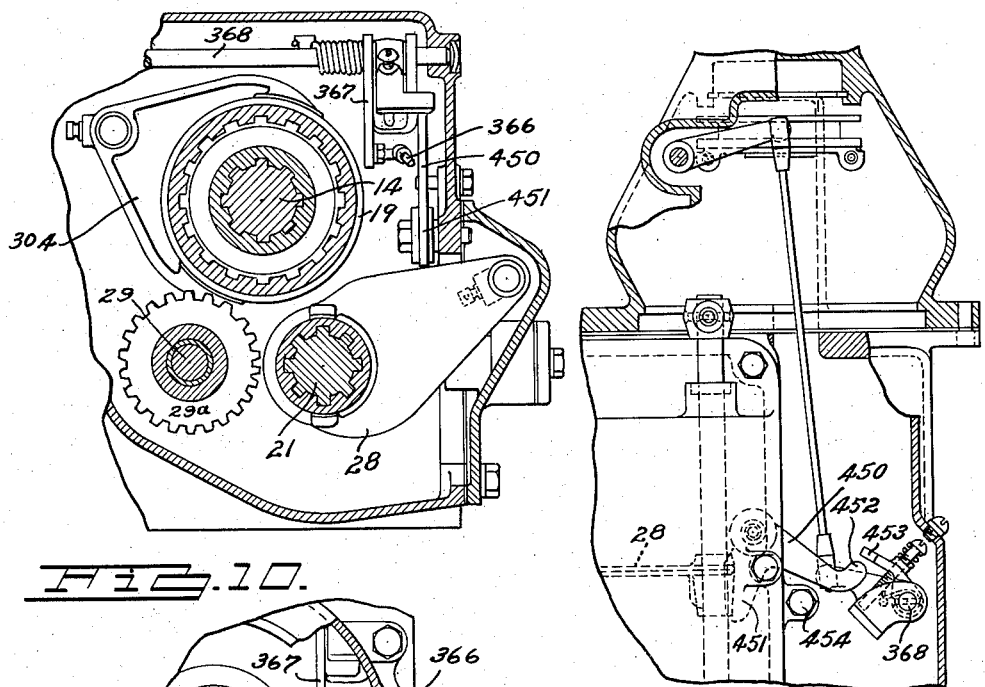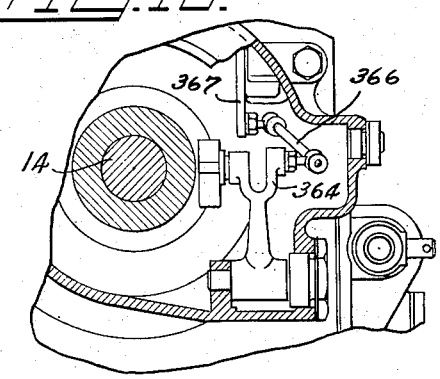

2,376,545

UNITED STATES PATENT OFFICE 2,376,545

TRANSMISSION

William T. Livermore, Grosse Pointe, Mich.

Application December 24, 1937, Serial No. 181,679

24 Claims. (Cl. 74—330)

This invention relates to transmissions for use with automotive vehicles and is particularly disclosed herein as a type of transmission which is automatically operated by a fluid pressure mechanism thereby eliminating the necessity for manual gear shifting.

Certain fundamental features of automatic transmissions have been developed by myself and are disclosed in United States issued Patents Nos. 2,019,146 and 2,100,810 and applications Serial Nos. 603,823 and 715,065. The present embodiment although it includes certain features disclosed in my other applications, is a development which has been the direct result of a considerable amount of additional research and experimental work. The present transmission is designed with consideration for size and arrangement thereby to provide a compact unit comparable in size with standard manually operated units.

Several of my earlier designs of transmissions, of the type described in the aforementioned patent applications, comprise a plurality of constantly meshed gear trains one for each of the gear ratios desired, there being an individual clutch to connect each individual gear train for operation. For automatic operation of this type of transmission a fluid pressure mechanism was used to actuate the clutches, this mechanism being under the control of a unit which was actuated by the combined effect of members movable in proportion to vehicle speed and engine output.

The present invention, while employing many of the fundamental features which were described and claimed in my previous applications, provides novel and important improvements thereon in both the general gear and clutch arrangement and in the fluid pressure mechanism for automatically operating the transmission. The gear and clutch unit in my improved design is considerably simplified both in number of parts and manner of operation, there being two separate clutches of such size and arrangement that they may be housed in the flywheel in substantially the same space as the present day conventional clutch unit. These two clutches are sufficient to provide automatic operation for three forward speeds by the provision of an automatically operated shifting device which changes the gear ratio of the gear train connected to one of the clutches while the other is in operation. This automatic gear shifting mechanism preferably includes a so-called synchronizer unit which brings one rotating member up to the rotative speed of another before effecting a connection between them, thus completing the connection without objectionable clashing. An automatic means of operating this synchronizer is combined to act in timed relation with the automatic mechanism for operating the two clutches in the flywheel. All of the above transmission mechanism is particularly adapted for automatic operation by fluid pressure mechanism to which novel additions have been made over my previously designed units.

It is therefore a primary object to provide a compact transmission unit adapted for automatic operation in which two or more clutches are engaged alternately to establish driving connection through two or more gear trains and to provide means for automatically altering the ratio through one (or both) of the gear trains while the other is in operation.

It is a further object to provide a gear changing mechanism to alter the ratio through one (or both) of the drives established by the alternately operated clutches, the said gear changing mechanism to be automatically operated by fluid pressure mechanism operating in timed relation with other fluid pressure mechanism used to actuate the clutches.

It is a further object to provide fluid pressure operated control mechanism for actuating a transmission, having means incorporated therein for controlling the rate of actuation of the several parts of said transmission in such manner as to properly time the operation of the several parts thereof.

It is another object to provide a gear changing mechanism of the type employing a synchronizing means for bringing rotating parts to the same rotative speed before effecting positive connection thereof, with automatic means for operating said mechanism including means to effect a pause in the movement of the actuating mechanism during the time the parts are being brought to the same rotative speed, followed by a rapid motion of the actuating mechanism to complete the positive connection.

It is a further object to provide a fluid pressure mechanism for operating a gear changing mechanism of the synchronizing type which will produce a desired variation in the rate of movement of its operating parts by control of the flow of fluid under pressure.

It is another object to provide for the control of a gear changing mechanism of the synchronizing type using fluid pressure for its operation so arranged that the full pressure available in the fluid pressure system will be effective to actuate the mechanism, means being provided to drain off fluid which leaks past the actuating parts, thereby to prevent building up of pressures in other parts of the system which would oppose movement of said actuating parts.

It is a further object to provide a fluid pressure operated clutch actuating unit which will be effective to prevent too sudden release of the clutch by provision of means to control the flow of fluid on release of pressure from said clutch control unit. Such a type of control (1) prevents jerky shifting due to sudden release of the driving torque; (2) holds the engine speed down during the time when the change in gear ratio is made; (3) prevents full release of the driving torque during the period when change in gear ratio is being effected.

It is another object to provide means in the fluid pressure control mechanism for applying fluid under pressure to actuate a clutch in such manner as to actuate said clutch slowly when used for shifting into lower gear so that the high torque transmitted at this time will not jerk the car.

It is a further object to provide means to prevent the automatic control mechanism for operating the transmission from changing the transmission gear ratio from the low speed to the high speed position when the transmission is set for reverse operation.

It is another object to provide means whereby an auxiliary pump for emergency use may have some of its parts used in common with some unit of the fluid pressure system.

It is a further object to provide an auxiliary pump combined with an accumulator piston in the fluid pressure system whereby a pumping action is effected by the reciprocating motion of said piston, said reciprocating motion being effected by a repeated operation of a clutch pedal located in the driver's compartment of the vehicle.

It is also an object to provide means for directing fluid under pressure to several operating units thereby to selectively operate a plurality of clutches and a synchronizer shifting unit in timed relation with each other.

It is another object to provide means for preventing the fluid pressure operating mechanism from changing the clutch connection before the synchronizer unit which has started its movement has effected positive connection between the rotating parts.

It is a further object to provide for clutch operation by fluid pressure actuated mechanism reacting and contained in a member rotating with the clutch, the rotating member being supported for rotation in a stationary housing, which housing also has means provided therein for feeding fluid under pressure for operating the clutch.

It is another object to provide fluid pressure operated mechanism, having the advantageous feature of rotation with the clutch, with means for preventing fluid used to actuate said fluid pressure mechanism from reaching the contacting parts of said clutch.

It is a further object to provide a mounting for a fluid pressure operated clutch operating member flexibly supported in the housing relative to the clutch and relative to the other parts of the transmission, thereby to allow for misalignment of parts.

It is another object to provide fluid pressure mechanism for operating the clutches, rotating with said clutches and flexibly supported relative to the transmission and clutch mechanism, said rotating mechanism also being used to carry a journal for a sleeve which connects one of the clutches with certain of the transmission gearing.

The above and other objects of the invention will appear more fully from the following detailed description of a practical embodiment of the invention and by reference to the accompanying drawings forming a part hereof and wherein:

Fig. 1 is a vertical section through a completely assembled transmission unit showing the general arrangement of the several parts.

Fig. 2 is a diagrammatic view showing particularly the arrangement of the fluid pressure mechanism for automatic operation of the transmission unit.

Fig. 2a is a view taken substantially on the line 2a—2a of Fig. 1 showing particularly the position of the fluid pressure control mechanism housing at the side of the transmission unit.

Fig. 2b shows mechanism for producing slower operation of the transmission when the toe-button control is actuated to shift the transmission to a lower speed.

Fig. 2c shows mechanism used to assure rapid build-up of pressure during the first part of the time used to actuate the clutches followed by a slow build-up of pressure near the end of the time required to actuate the clutches.

Fig. 3 is a section taken substantially on the line 3—3 of Fig. 2a and shows a section through the fluid pressure control unit and discloses in partial detail the accumulator piston, the pressure control valve, the selector valve and the differential lever.

Fig. 4 is a horizontal section taken substantially on the line 4—4 of Fig. 2a and shows particularly the mechanism for automatic operation of the synchronizer unit.

Fig. 4a is a view of the synchronizer operating piston and cylinder and shows particularly the fluid pressure conduit system for operating this unit.

Fig. 5 is a vertical section taken substantially on the line 5—5 of Fig. 3 and shows a cross-sectional view of several of the fluid pressure control units.

Fig. 6 is a fragmentary sectional view taken substantially on the line 6—6 of Fig. 3 and shows an end view of the lever mechanism shown in the side view of Fig. 3.

Fig. 7 is a top fragmentary sectional view taken substantially on the line 7—7 of Fig. 1 and shows a part of the connecting linkage between the vehicle speed responsive governor and the differential lever.

Fig. 8 is a fragmentary section taken substantially on the line 8—8 of Fig. 7 and shows further details of a part of the linkage connecting the governor and the differential lever as well as the shifter forks for operating the synchronizer unit and reverse drive.

Fig. 9 is a view intended primarily to show the means for rendering the automatic gear shifting mechanism inoperative when the transmission is set in reverse drive position; the view showing the parts as they would be seen from the top of Fig. 8 with a portion of the housing removed and also partly broken away.

Fig. 10 is a section taken substantially on the line 10—10 of Fig. 7 and shows details of the lever mechanism connected with the governor control.

Fig. 11 is a section through a clutch plate and facing showing a resilient mounting between a clutch plate and its facing.

Fig. 12 is a view taken substantially on the line 12—12 of Fig. 11 and shows further details of the resilient member between a clutch facing and a clutch plate.

GENERAL ARRANGEMENT

Referring to Fig. 1 there is shown a section through a transmission disclosing the general arrangement of the gear and clutch unit together with a portion of the fluid pressure mechanism and controls.

The general scheme of the arrangement shown in Fig. 1 requires two clutches 10, 11, which are enclosed within a fly-wheel 12, the combined design of fly-wheel and clutches being so worked out that the size of the fly-wheel unit is not increased unduly by the addition of the two clutches. By a fluid pressure mechanism designated generally as 13 which is designed to rotate with the fly-wheel the clutches 10 and 11 are actuated to either connect the engine driven fly-wheel 12 to a main shaft 14 or to a sleeve 15. The sleeve 15 has a gear 16 attached at its outer end. The main driving shaft 14 extends entirely through the transmission and, therefore, when the engine driven fly-wheel is directly connected with shaft 14 by means of the clutch 11 a direct drive is effected. Normally free to rotate upon shaft 14 are provided two gear units, 17 and 18, which may be selectively connected to rotate positively with shaft 14 by means of synchronizer unit 19. A counter-shaft 21 is provided below the main shaft 14 and has mounted thereon a gear 22, which is constantly meshed with gear 16 of the sleeve 15. Also mounted on counter-shaft 21 and formed integral with gear 22 is a gear 23 which is in constant mesh with gear 17, which may be connected with drive shaft 14 by synchronizer 19. Gear unit 18 is of spool shape and has two gears at the ends thereof, namely 24 and 25. Connected to counter-shaft 21 by suitable splined connections so as to rotate therewith but free to slide lengthwise thereof, are a pair of gears 26, 27, adapted to be actuated for sliding movement by fork 28, a portion of which is shown in Fig. 1. When the gear unit 26, 27 is moved to the right along shaft 21, as shown in Fig. 1, the gear 26 will mesh with the gear 24 and on still further movement toward the right, the gear 27 will mesh with the gear 25.

As the gear and clutch set up is shown in Fig. 1 and using the parts above described, the device operates substantially as follows: For low gear the gear unit 26, 27 is moved to maximum distance to the right so that gear 25 is in mesh with gear 27. The clutch 10 is actuated by the fluid pressure mechanism, later to be described, and the engine driven fly-wheel 12 is thereby connected with the sleeve 15 causing rotation of the gear 16. The gear 22 is driven by gear 16 and rotates shaft 21, carrying gear 27 which meshes with gear 25 on shaft 14. Since at this time the synchronizer 19 has been moved to connect gear unit 18 and gear 25 to the shaft 14, the drive is completed.

For second speed, the gear 26 is first put in mesh with gear 24 and the same gearing above described effects second speed. For traffic driving the manually moved gears 26, 27 are left in position so that the gear 26 is meshed with the gear 24. The automatic control of the device is used to change the gearing from the normal second speed to direct drive and then to over-drive. This is accomplished by a fluid pressure unit which moves the synchronizer 19 in timed relation with the fluid pressure unit which engages and disengages clutches 10 and 11 at the proper time.

The shift from second speed, to the next higher ratio of direct drive is effected by the fluid pressure mechanism first actuating the clutch 11 to connect the fly-wheel 12 directly with the shaft 14, and releasing clutch 10, thereby removing the driving load from the low gear train and synchronizer and applying it directly to the shaft 14. The next step is to actuate the synchronizer 19 by moving the collar thereof toward the left as shown in Fig. 1. This movement disconnects the gear unit 18 from the shaft 14 and effects connection of gear 17 to said shaft 14.

The change from direct drive to overdrive is effected by disconnecting clutch 11 and connecting clutch 10, the synchronizer 19 having been previously actuated to connect the gear 17 to the shaft 14. The drive then is through sleeve 15, gear 16, gear 22, gear 23, gear 17 and out through shaft 14.

The arrangement of clutches and gearing makes it possible to have clutches which are engaged alternately to establish driving connection through various drive ratios and means for automatically altering the ratio through one of them while the drive is through the other.

It is understood that the automatic mechanism for effecting these changes is controlled by other automatic units later to be described but the present description is for the purpose of showing the general scheme of gear, clutch and synchronizer set-up.

The movement of the gears 26 and 27 along shaft 21 is intended to be manual and there is also provided a reverse counter-shaft 29, with a suitable gear 29a (Fig. 8), with which gear 26 may be meshed by movement toward the left from the position shown in Fig. 1. Therefore, with the manual movement of the gear unit 26, 27 along counter-shaft 21 it is possible to effect reverse drive or to set up the unit for starting in either low or traffic second speed. For ordinary city traffic driving the unit would be left in the second speed position and automatic operation would be effected from second through direct drive and then into over-drive, thus affording three automatic speeds. It is, of course, apparent that the gear unit could be designed to provide three automatic speeds of any desired ratio with possibility of changing one of these speeds to a different ratio by manual operation and, in addition, to provide a manually controlled reverse.

It is particularly to be noted that this transmission set-up makes it possible to disconnect the lower drive ratio gears from the propeller shaft when the higher ratio gears are in operation, thereby eliminating the idle running of the low speed clutch and gearing at excessive speeds during high speed operation. This feature is noted with reference to Fig. 1 where it is apparent that when the unit is in overdrive position, where it remains for a major portion of the time, the gear unit 18 will be disconnected from shaft 14. Gear unit 18, shaft 21 and gears 22, 23, 26 and 27 are then driven at relatively low speeds through gear 17.

As shown and described the transmission provides three forward speeds adapted for automatic operation with a fourth ratio available with a manual shift. Obviously the three speeds for automatic operation might be selected at a different ratio than herein shown without change in principle.

As previously mentioned, the mechanism for operating the clutches 10 and 11 of the transmission is mounted for rotation with the flywheel and clutch unit. The mechanism is fluid pressure operated and comprises a plurality of pistons and cylinders mounted in a member 30 which is of such shape as to be mounted upon and surround the sleeve member 15, a projecting circular portion of the member 30 providing space for six horizontally disposed cylindrical openings, three of these cylinders with suitable pistons being used for actuation of the clutch 10 and the other three being used to actuate the clutch 11. The member 30 is secured to rotate with the flywheel 12 and secured from endwise movement by screw 30a, shown in Fig. 1. The six cylinder and piston units may be spaced around the member 30 in any suitable position so that three equally spaced lever units for each clutch may be actuated. There is shown in Fig. 1 one cylinder unit 31 for actuating the clutch 10 and also one of the three cylinders 32 for actuating the clutch 11. It is understood that the other two units of each set are of similar construction. Considering the actuating unit for clutch 10, a piston 33 is mounted in the cylinder 31 with suitable connections to a lever 34 which is pivoted at 35 and actuates a rod 36 connected with the clutch 10, as shown. It is therefore apparent on inspection of Fig. 1 that a movement of the piston 33 toward the left will move the connecting linkage in such direction as to engage the clutch 10 and thereby connect the engine driven flywheel 12 to rotate sleeve 15. Similarly, the other set of cylinders will actuate the clutch 11 through a piston 37, a lever 38 pivoted at 39, and a connecting rod 40. It is noted that the lever 38 is so pivoted relative to the rod 40 that movement of the piston 37 pushes the rod 40 toward the left, as shown in Fig. 1, which direction of movement actuates the clutch 11 and connects the flywheel 12 to rotate the shaft 14. It is an important feature of the above described construction that the endwise reaction from the pistons is transmitted to the flywheel through the connection effected by the set screw 30a and since the whole clutch operating unit 30 rotates with the flywheel the endwise reaction from this unit is not transmitted to the bearings of the transmission or engine.

*Transmission operating mechanism*

There is shown in Fig. 2 a diagrammatic view of the several units of the fluid pressure control mechanism which make up the unit for automatic operation of a transmission of the general type just described. In the mechanism illustrated in Fig. 2 there is provision for operation of two clutches, one of which operates a first and a third speed, and the other of which operates a second speed, these clutch operating members being designated as pistons 121 and 122. The synchronizer shifter fork 123 is for the purpose of changing the connection from first to third speed while the second speed clutch piston 122 is in operation.

It is understood that the first, second and third speeds as designated above might be the second, direct and overdrive ratios respectively as disclosed in the transmission shown in Fig. 1 and previously described. Obviously however, the same type of operating mechanism as herein disclosed might well be used to operate a transmission having the conventional low, intermediate and high speed ratios.

The mechanism for automatic operation is actuated by fluid under pressure. A pump 124 is driven from the engine of the vehicle and draws oil from a sump provided in the lower part of the transmission through an intake conduit 125, fluid under pressure being delivered to a pump outlet conduit 126 which leads to accumulator chamber 127. A spring loaded accumulator piston 128 is mounted for operation above the accumulator chamber 127 and serves to limit the maximum pressure available in the accumulator chamber by provision of a by-pass 129 which leads to the sump and which is in a position to be opened when the spring loaded piston 128 passes a definite position. An outlet 131 from the accumulator chamber is provided and a check valve 132 allows one way movement of the oil from the accumulator chamber 127 into conduit 133.

For the purpose of providing a variation in the size of the conduit leading from the accumulator chamber a jet changer 134 is provided. This unit comprises a sliding member 136 with various sizes of openings therein, and in the particular unit used for illustration there is a large opening 137 and a small restricted opening 138. The small orifice 138 is placed in position for operation when it is desired to have a slower clutch engaging movement of the device and the larger unrestricted opening 137 is used when faster clutch engaging movement is desired. The continuation of the conduit 133 is here shown as a smaller passage 133a which leads to the inlet opening 139 of a pressure control valve 141. The smaller size of conduit 133a results in a slow fluid flow when the fluid is cold as in starting with a cold engine.

The function of the pressure control valve 141 is to provide required variation in the pressure of the oil used to actuate the clutch operating pistons 121 and 122. It is to be understood that for most efficient clutch engagement there is of necessity a lower operating pressure required at small throttle openings than is required at greater throttle openings. The pressure control valve is connected to the throttle control by a stem 142 which abuts at its lower end with a plug 142a engaging the upper end of a spring 143 mounted in the bottom of the pressure control valve cylinder. With the opening of the throttle the stem 142 is pressed downwardly thereby reducing the tendency of spring 143 to compress spring 143a, thus relieving the pressure on valve 144 and permitting the fluid pressure in conduit 146 to increase. The upper end of the pressure control valve has a valve member 147 held by a spring 148 to close the end of a sump outlet opening 149. Springs 148 and 143a are of such strength that valve 147 will always hold any pressure admitted through valve 144 but provides an outlet to reduce the pressure in conduit 146 when the throttle is released. With increase in throttle opening the downward movement of the valve stem 142 reduces the compression of inlet valve spring 143a and increases the compression of outlet valve spring 148, thereby allowing maximum pressure available to be fed into conduit 146 and held there. However, when the throttle is near its closed position outlet valve spring 148 will be less compressed and will allow valve 147 to release, thereby providing a lower fluid pressure in conduit 146 at small throttle openings.

As shown, there are three separate outlet conduits branching from the conduit 146, i. e., 151, 152 and 153. These conduits are positioned to open into a selector valve cylinder 154 in which a selector valve member 156 is mounted for sliding movement.

Although the design of selector valve shown herein provides some new features, the general arrangement of the valve and its housing are similar to that employed in my co-pending applications, Serial Nos. 584,812 and 715,065, and in my United States Patent No. 2,019,146. In the constructions described in the above applications fluid under pressure is fed to desired units by positioning the valve to connect ports which open into the valve cylinder, suitable annular rings being cut in the valve body to connect the inlet ports with outlet ports on the opposite side of the valve cylinder when the valve body is in proper alignment.

The mechanism for positioning the selector valve will be described later. For the present it is sufficient to state that means is provided to move the valve body 156 progressively upward, as shown in Fig. 2, when it is desired to shift through the available range from lower to higher gear ratios and in opposite direction to shift from higher to lower gear ratios. This positioning mechanism, as will later appear, is preferably automatic in operation, but it is to be understood that many advantages of the fluid pressure operating mechanism would remain regardless of the means used to position the selector valve.

Continuing with the description of the showing in Fig. 2, the outlet conduits 151, 152 and 153 are spaced along, and open into, the selector valve cylinder 154. The body of the selector valve member 156 has an annular groove 157 cut in its periphery and the valve member 156 is shown positioned to connect, through this groove 157, the outlet conduit 152 with the conduit 158 on the opposite side of the selector valve opening. The conduit 158 leads directly to cylinder 159 for operating the clutch operating piston 121. As here shown, the piston is being actuated to operate the clutch to effect first or low speed of the vehicle. Also in the selector valve member 156, a drilled opening 161 is provided which opens into the hollow central portion of the selector valve member 156 and connects to the sump. The drilled opening 161 is so positioned when groove 157 connects conduits 152 and 158 as to align with a conduit 162 which is connected to a cylinder 159a for operation of another clutch operating piston 122. The alignment of opening 161 with conduit 162 connects cylinder 159a with the sump and releases all pressure therein and it follows that the clutch which is operated by the piston 122 must then of necessity be disengaged.

It is noted that the conduit 152 is provided with a restricted opening for the purpose of effecting a slow engagement of the first or low speed clutch to simulate the conditions found most advantageous for this operation.

Also provided in the selector valve member 156 is a drilled opening 164 which is more restricted than the similar opening 161. Like the opening 161, the opening 164 connects the outside of the selector valve member 156 with its hollow central portion and is so positioned that when the selector valve member 156 moves upwardly the drilled opening 164 is in alignment with the conduit 158 leading to the cylinder 159 of the first speed clutch piston 121. This connection results in the release of pressure in said cylinder 159 through the restricted opening 164 thereby effecting a slow release of the first speed clutch. The same upward movement of the selector valve member 156 causes the annular groove 157 to come in alignment with the conduits 162 and 153, thereby effecting a connection between these two conduits and allowing fluid under pressure from conduit 146 to be admitted to conduit 162 and thence into cylinder 159a to actuate piston 122 which engages the second speed clutch. By the movement of the selector valve member 156 just described there has been effected a reversal of the clutches, i. e., clutch operating piston 121 has thrown its clutch out of engagement and clutch operating piston 122 has had the pressure admitted to its cylinder to engage the clutch attached thereto.

As the car increases in speed the control mechanism continues to move the selector valve in an upward direction. Adjacent the last mentioned drilled opening 164 in the selector valve 156 there is provided an annular groove 166 which is similar to the groove 157 but of greater length. The groove 166 is of such length and position that when its upper edge comes into alignment with the conduit 158 it bridges the conduits 151 and 152 so that there is an unrestricted flow of fluid under pressure into the conduit 158 to again actuate the piston 121, this time for a third or highest speed operation, the ratio of the gearing having been changed by the operation of the shifter fork 123 in a manner which will be explained presently. The reason for the bridging of the conduits 151 and 152 by the longer annular opening 166 is because it is not desired to have the inlet of fluid under pressure to actuate this clutch for third speed to be a restricted or slow movement as was the case when the same clutch was previously actuated from the conduit 152 alone for first speed. The same movement of the selector valve member 156 which bridges the conduits 151 and 152 by annular opening 166 and connects them with conduit 158, places the restricted outlet conduit 164 in position to release pressure from conduit 162, thereby effecting a gradual release of piston 122 and the clutch connected therewith. The positioning of the various annular grooves of the selector valve and the provision of restricted and unrestricted openings positioned as above described results in a proper timing of the operation of the clutches by providing the required amount of overlap between the actuation and release of consecutively operated clutches, thereby preventing both racing of the engine and objectionable jerking of the car.

There has been described above the mechanism which first actuates the first speed clutch, then throws it out of engagement and actuates the second speed clutch, then releases the second speed clutch and actuates the first mentioned clutch a second time, this time for third speed operation. The mechanism for operating the synchronizer which makes it possible to change the gearing connected with the first and third speed clutch so that this clutch may be used for the dual purpose mentioned will now be considered.

*Synchronizer operating mechanism*

The fluid under pressure for the actuation of the synchronizer operating mechanism does not come through the pressure control valve as does that used for actuating the clutches, it being unnecessary when shifting this unit to change the pressure for varying degrees of throttle opening. For effecting this result a conduit 171 leads directly from the accumulator chamber 127 and connects with the conduit 172 which leads to two selector valve inlet ports 173 and 174. Fluid under pressure from the accumulator chamber is thus made available at the selector valve. In the position shown in Fig. 2 pressure from the conduit 174 is being allowed to enter a conduit 176 because of the alignment of an annular groove 177 in valve member 156 with the conduits 173 and 176. At the same time a drilled opening 178 leading into the center of the selector valve member 156 is placed in communication with a conduit 179, thereby connecting said conduit 179 with the sump and releasing all pressure therein. As shown in Fig. 2, conduit 176 leads to one end of a cylindrical chamber 181, the conduit having means to provide a restriction to flow in the direction away from the cylindrical chamber 181 but to allow free passage of fluid in a direction toward said chamber. This result is accomplished by a star-shaped orifice member mounted in the conduit as indicated at 182 so that movement of fluid in the direction toward the chamber 181 allows the orifice member to lift off its seat and allow free passage of the fluid under pressure, while in the opposite direction the orifice member is seated and provides a restriction in the conduit 176.

The conduit 179 previously mentioned leads to the opposite end of the cylindrical chamber 181 and is similar in shape and configuration to conduit 176, there being an orifice 183 similar to 182 which provides restriction to flow away from cylindrical chamber 181 and unrestricted flow toward said chamber. A synchronizer operating piston 184 is mounted for reciprocation in cylindrical chamber 181 and by its reciprocation moves the synchronizer operating shaft 185 on the end of which is mounted the previously mentioned synchronizer shifter fork 123. From the general lay-out just described, and by reference to Fig. 2, it is apparent that the piston 184 is moved in one direction by admission of fluid under pressure through conduit 179 and in the opposite direction by admission of fluid under pressure through conduit 176. When one of these conduits is connected to the pressure line the other must of necessity be connected to the sump so that oil in the low pressure end of the cylinder will be allowed to flow out. For the purpose of controlling the movement of the piston 184 the previously mentioned orifices 182 and 183 act in such manner that there is a restriction to flow of fluid out from the cylinder 181 while the fluid under pressure entering the opposite end of the cylinder is always allowed to enter unrestricted. This feature is considered important since it allows control of the rate of movement while still maintaining full pressure on one end of the piston. In this connection an important and novel feature has been incorporated in the design of the synchronizer operating piston by provision of an annular groove 184a around the central portion of the piston, this annular groove being drained to the sump through an opening 184b in the casing of cylinder 181. It has been found that such a construction is very advantageous. Since the control of flow is effected by a restricted orifice on the outlet side of the piston, if fluid under pressure from the inlet side should leak past the piston it would have a direct effect on the rate of movement of the piston, and would produce a back pressure against the outlet side of the piston. However, if leakage from the inlet side is drained off at the center, the restricted outlet is free to control the movement without any detrimental build-up of pressure by leakage past the piston. In this way full pressure from the inlet to move the piston is assured, whereas if the leakage were allowed to build up on the outlet side the full inlet pressure would not be available because it would be partly offset by leakage pressure on the opposite side of the piston.

Considering the operation of the synchronizer shifting unit in connection with the mechanism for operating the clutch pistons 121 and 122 previously described, it is apparent because of the positions of groove 177 and drilled opening 178 relative to conduits 176 and 179 that the synchronizer operating piston will be subjected to pressure such as to hold it in the position shown in Fig. 2 until the selector valve has moved upwardly by increase of car speed a distance sufficient to bring drilled opening 178 in alignment with conduit 176. When this position is reached the pressure line previously connected with conduit 176 will be cut off and drilled opening 178 will connect conduit 176 with the sump and release pressure therein while a second annular groove 186 will connect the pressure line with conduit 179. Because of the admission of fluid under pressure through said conduit to the lower end of cylindrical opening 181, the piston 184 will be moved in an upward direction carrying with it the synchronizer operating shaft 185.

The ports and grooves of the selector valve for operating the clutches and the synchronizer are so positioned relative to each other that on upward movement of the valve member 156 the previously described release of pressure on piston 121 and the admission of pressure to piston 122 are both effected before the pressure is reversed on the synchronizer cylinder to start its movement in the opposite direction. When these changes in pressure flow have been accomplished and the synchronizer piston started on its travel it is necessary that pressure conditions remain unchanged until the shift of the synchronizer is completed, because power applied by the clutch engaged by piston 121 is transmitted through the synchronizer, and should this clutch be engaged while the synchronizer is in motion, damage would result. Satisfactory operation is assured by the provision of interlock pins 187 and 188 which serve to hold the selector valve member 156 from further movement until the synchronizer piston has reached its maximum movement and completed its work. Two recesses 189 and 190 in the synchronizer operating shaft 185 are positioned to allow the pins 187 and 188 to move backwardly away from annular projections 191 and 192 when the synchronizer shaft 185 reaches the end of its travel. The two interlock pins 187 and 188 are spaced as shown in Fig. 2 for the reason that one of them acts when the synchronizer movement is in one direction and the other when the movement is in the opposite direction, the relative positioning of the pins and the projections being such as to effect the required fixed positioning of the selector valve during the time necessary to complete the synchronizer shift. When the synchronizer operating shaft comes to the end of its travel in either direction, pin 187 or 188 drops into the slot and away from the projection against which it has been riding, and the selector valve is again free to move and on further upward movement will change the alignment of the drilled openings 161 or 164 and the annular groove 157 to reverse the pressure conditions in the conduits 158 and 162, thereby to put the opposite clutch 121 in operation for effecting the third forward speed.

A control cable unit 193 is used to connect the sliding member 136 of the previously mentioned jet changer 134 with the end of the synchronizer operating shaft. By this connection the large less restricted opening 137 is placed in position for communication with the conduit 133 when the synchronizer is in position for low speed, as shown in Fig. 2, while in the opposite position of the synchronizer the action of the control cable is to move the sliding member 136 of the jet changer to place the more restricted opening 138 in position for operation in the conduit 133, the effect of which will be to provide a slower shifting action for shifting down from third to second speed than up from first to second. The purpose of this arrangement is to provide an interval of time during the shift from third to second to permit the engine to accelerate to a proper speed to drive the car in second. If the shift is completed too soon, the car will drive the engine momentarily, producing an unpleasant drive reversal or "backlash." The desired result is accomplished by the jet changing device without delaying the shift from first to second, which must be made promptly to prevent the engine from racing unduly during the shift. It is to be noted that when shifting from a high gear to a lower one, the engine must increase its speed, whereas when shifting from a low to a higher gear the engine speed must be decreased by the clutch application. The jet changer connected as shown provides proper time intervals for the up shift from first to second and the down shift from third to second. Its effect on the other shifts is relatively unimportant.

Further details of the synchronizer operating piston and its spring connected synchronizer operating shaft 185 will be considered when the actual unit is described in another section. It is also to be understood that the term synchronizer as used in the above description might well include several different types of mechanism for changing gear ratio by a transverse shift of a member such as shown at 123.

In the upper portion of Fig. 2 there are shown certain control mechanisms. The general arrangement of the control for actuating the selector valve by the combined or differential action of vehicle speed and throttle control position, although including certain additional and novel features, is similar to that described in my co-pending application, Serial No. 603,823. There is shown in Fig. 2 a governor 194 driven at vehicle speed which actuates one end of a differential lever 196 and a throttle and foot accelerator unit which through rod 195 actuates the opposite end of the differential lever 196. The lever 196 is pivoted on the selector valve control rod 197 and thereby the selector valve is positioned by the differential effect of throttle control position and vehicle speed.

The carburetor and throttle unit of the engine is shown at 198 with connection to the throttle for both hand operation and foot accelerator. The connection between the accelerator pedal and the throttle is effected by a rod 60 in which is incorporated a thermostatic element 61. The bell crank lever 62 connects the rod 60 with the vertical rod 195 which connects with the differential lever 196. The use of the thermostatic element 61 in the connection between the throttle and the differential lever, as above outlined, provides an automatic adjustment for variation with temperature which is very important for use with hydraulic operated transmissions depending on the throttle for control. In the present case the throttle being connected to actuate one end of the differential lever 196 and secondarily connected to actuate the pressure control valve through rod 142, the thermostatic element 61 will vary the relative position between the throttle and the units it controls.

With the use of the throttle as one of the elements for controlling the automatic transmission it follows that the operation of the accelerator pedal 62 will automatically operate the fluid pressure control system for the transmission, and it can be imagined that this would not be always desired. In order to provide an independent control of the engine throttle which will not also operate the transmission control mechanism, a separate hand throttle unit 80 is provided, as shown in the upper portion of Fig. 2. This hand throttle control is connected to a separate throttle lever 81 by control cable 82. The lever 81 actuates the throttle without moving the rod 60 or the accelerator pedal and its connection 195 to the transmission operating mechanism. There is thereby provided an independent control of the engine throttle.

A clutch pedal 199 is shown with a lever 200 attached thereto for manual actuation of the accumulator piston 128. By inspection of Fig. 2 it is apparent that downward pressure on the clutch pedal such as normally would be used to throw out the clutch in a conventionally controlled car will result in moving the accumulator piston upward a sufficient distance to open the by-pass 129 and release pressure from the accumulator chamber 127 and therefore release the pressure in the system and disengage any clutch which may be in engagement. In other words, the same result as in conventionally controlled cars is accomplished by the downward pressure of the clutch pedal, i. e., the throwing out of the clutch.

The connection of the clutch pedal to the accumulator piston serves another purpose, namely, that of an auxiliary pump for emergency operation when required. This result is accomplished by working the clutch pedal up and down and thereby reciprocating the accumulator piston 128. Because of the provision of a check valve 201 oil is drawn into the accumulator chamber 127 from the sump and the pressure increased in the chamber to a sufficient amount for emergency operation of the device.

Near the accelerator pedal in Fig. 2 there is shown a second and first gear toe-button 202 which is used to hold the upper end of the selector valve control rod in position so that it will not shift out of second or first gear as may be desired depending upon the amount of movement given to the toe-button 202.

As shown in Fig. 2b, it is intended to incorporate with the toe-button control 202 a means to change the rate of clutch application for the purpose of effecting a slower build-up of pressure when the shifting by means of the toe-button is from a higher speed to a lower speed, such as is the condition when shifting down to the second speed position to use the second gear for the purpose of retarding the motion of the car. As shown in Fig. 2b, this is accomplished by two sizes of jets interposed in the fluid pressure system and controlled by the rod 63 which is actuated by the movement of the toe-button 202. The conduit 67 leads from the accumulator cylinder and branches into conduits 65 and 66 which are connected with the vertical opening 68, the outlet to the pressure control valve being shown at 69. The rod 63 controls a piston member 64 which covers an unrestricted opening in conduit 65 and forces the liquid to go through a restricted jet

66. Therefore, whenever the toe-button 202 is depressed to hold the transmission in the second speed position the piston 64 will cover the unrestricted opening and force the fluid pressure to flow through the restricted jet 66 and therefore produce a slower operation of the transmission.

Although in Fig. 2b the rod 63 which controls the closing of the unrestricted opening 65 is shown operated by the toe-button 202, such a unit might also be set up to be actuated by the vehicle speed governor and when so connected would provide means to assure slower operation of the fluid pressure actuating mechanism at higher vehicle speeds thereby increasing the time required for clutch application at the higher speeds. The unit shown in Fig. 2b actuated by the governor 202a as shown in Fig. 2d would be in a position to furnish unrestricted flow of fluid under pressure at low speeds, but as the speed of the governor increased would close the opening 65 and thereby require slower operation by forcing the fluid under pressure to go through the restricted opening 66. Similarly, it might be possible to actuate the unit by means of a thermostatic element 202b as shown in Fig. 12 and thereby vary the time required to actuate the clutches in proportion to temperature conditions.

It has been found in operation of fluid pressure transmissions of this type that it is important to provide means between the pressure control valve and the selector valve to allow the pressure to build up very quickly at the beginning of any clutch application, but as the maximum pressure actuating the clutch is approached it is very advantageous that the pressure then build up more slowly. This is accomplished by the mechanism shown in Fig. 2c wherein conduit marked 70 leads from the pressure control valve and branches into conduit 71 having a large opening provided with a ball check valve 72 retained by a spring 73. The other branch of the conduit 71a contains a restricted orifice 74. The two branched conduits both connect into the conduit 75 which leads to the selector valve. In the branched conduit 71 in which is incorporated the large orifice and the spring retained ball check valve, the spring 73 is so selected as to hold the check valve closed to a pressure a little under the maximum pressure which is desired. Therefore, at the beginning of any pressure change the high pressure which is naturally thrown into the conduit 71 will hold the ball check valve 72 open and allow flow through the unrestricted opening and the pressure will therefore build up quickly. However, as the pressure builds up in the conduit 75 and the maximum pressure is approached the spring 73 will cause the ball check valve to be closed and force the flow to go through the restricted jet 74 and therefore during the remaining time of the build-up to the desired maximum the change will be a slower one.

DETAILS OF MECHANISM FOR AUTOMATIC OPERATION

The basic features of the fluid pressure mechanism for automatic operation have been described in connection with the diagrammatic disclosure in Fig. 2. However, for the purpose of demonstrating the actual application of my ideas to a practical structure and also to disclose certain additional novel features of the device, there is shown in the drawings and described hereinafter, a mechanism suitable for actual operation and assembly with the transmission unit shown in Fig. 1.

The mechanism will be described under the following headings:
 (a) Fluid pressure pump;
 (b) Accumulator;
 (c) Pressure control valve;
 (d) Selector valve and connections to actuating units;
 (e) Synchronizer control cylinder and control parts to connect with synchronizer;
 (f) Synchronizer and selector valve interlock;
 (g) Governor;
 (h) Controls from governor and throttle to differential lever;
 (i) Reverse interlock;
 (j) Clutch operating mechanism and support in transmission housing;
 (k) Details of clutch construction to adapt for automatic operation.

(a) *Fluid pressure pump*

Referring to Figs. 1 and 5, it is noted that a fluid pressure pump numbered 50 is mounted in the lower central portion of the transmission housing. This pump, as shown in Fig. 1, has attached to its shaft a gear 51 which is driven from a gear 52 attached to a sleeve extension of the rotating housing provided for fluid pressure mechanism 13. This entire unit, it will be remembered, rotates with the engine driven flywheel 12 and therefore rotates at all times when the engine is operating. The detailed construction of the pump, which is of the vane type will not be considered in detail here as it forms no part of the present invention.

The outlet from the pump 50 is connected by a conduit 200 to discharge fluid into accumulator cylinder 207 (Fig. 5).

(b) *Accumulator*

Referring to Fig. 3, a piston 209 is mounted in the accumulator cylinder 207 above mentioned. As pressure is built up in the cylinder 207 by the action of the pump the pressure causes the piston 209 to react against a spring 211 mounted behind the piston between suitable abutments 212 and 213. When the pressure in cylinder 207 becomes sufficient to move piston 209 past an opening 216 (see Fig. 3) the fluid is by-passed back through a conduit 217 which is connected with the sump. The result is that the pressure in the accumulator cylinder is maintained at a pressure determined by spring 211 and when such pressure exceeds a definite amount the fluid is by-passed to limit the pressure accordingly.

As shown in Fig. 3, there is provided a shaft 214 which is secured to the piston 209 and projects outwardly of the housing as shown. When suitable actuating means are provided for this shaft it is possible to use the accumulator piston as an auxiliary pump. For such use the piston is reciprocated and draws oil from the sump at 203 through check valve 204 into conduits 206 and 208 and thence into the cylinder 207 (see Fig. 5).

At the top of the accumulator cylinder 207 (see Figs. 3 and 5) there is provided an outlet conduit 218 (see Fig. 5) from the accumulator in which conduit is a ball check valve 219. This conduit 218 connects with a pressure conduit 221 (see Figs. 3 and 5) which carries the fluid under pressure from the accumulator cylinder to a conduit 222 having a restriction therein (see Fig. 5) which opens into the pressure control valve cylinder 223.

(c) *Pressure control valve*

The function of the pressure control valve is to provide for changes in the pressure of clutch application between large and small throttle opening positions. This valve, therefore, controls the pressure of the fluid fed to the selector valve for use in actuating the two clutches 10 and 11. The pressure control valve is provided with a cylindrical body portion 224 (see Fig. 3) on the central axis of which is slidably mounted a valve stem 226. This valve stem has slidably mounted thereon two valves 227 and 228 which are seated in the opposite ends of the central opening through the body portion 224. Toward the right hand end of the valve cylinder there is provided a cylindrically shaped abutment member 229 which has a recess 231 in its inner end, the abutment portion 229 extending outwardly from the cylinder opening. The valve stem 226 has an extension which abuts against the base of the inner recess 231 and there is provided a spring 232, one end of which reacts against the inner face of the recess 231 and the opposite end against the valve 228. In the opposite end of the valve a spring 233 is so mounted as to react between a plug 236 at the end of stem 226, and the valve 227, thereby tending to hold said valve 227 upon its seat. Also at this end of the pressure control valve and mounted in the pressure control valve cylinder 223 there is a spring 234 which reacts between the plug 236 and a plug 236a which closes the end of the cylinder 223.

In operation, oil under pressure from the conduit 222 enters the pressure control valve through conduit 237. By a system of levers, which will later be more fully described, the throttle control position is reflected by the movement of a lever 238, the end of which lever abuts against the projecting cylindrically shaped abutment member 229. As shown in Fig. 3, small throttle openings are indicated when the end of lever 238 is near the maximum position to the right, and increased throttle openings are indicated by movement of the lever 238 to the left, as viewed in Fig. 3. It is apparent, therefore, that for small throttle openings the valve stem 226 will be only slightly moved toward the left from its maximum right hand position and will therefore compress spring 234 a small amount and release spring 233 a small amount. The result is that valve 227 offers greater resistance to the oil pressure from conduit 237 and releases less pressure than is the case when the end of lever 238 is positioned a considerable distance toward the left in Fig. 3, thereby compressing the spring 234 and releasing spring 233 to a greater extent and causing valve 227 to offer less resistance to the oil from conduit 237 and therefore releasing a larger pressure.

The outlet valve 228 is held closed by spring 232 and when the pressure inside the pressure control valve exceeds that necessary to lift valve 228 off its seat the pressure will be reduced by outlet of fluid to the sump through valve 228. The spring pressure holding valve 228 on its seat is increased with larger throttle openings by the movement of abutment 229 to the left. With increase in throttle opening the movement of the valve members toward the left reduces the compression on inlet valve spring 233 and increases the compression on outlet valve spring 232, thereby increasing the pressure of the fluid allowed to flow through the pressure control valve to the selector valve as the throttle openings increase.

(d) *Selector valve and connections to actuating units*

The function of the selector valve is to direct the fluid under pressure to proper conduits to automatically operate the clutches and the synchronizing unit. A cylindrical opening for movement of the valve is provided by a sleeve member 250 which is mounted in a substantially cylindrical drilled opening in the housing. This sleeve member provides a plurality of inlet and outlet openings leading to and from the central cylindrical opening in which a selector valve cylinder 251 is mounted for sliding movement. The cylindrical valve 251 has a central opening 252 extending longitudinally through its center and has provided on its surface suitable grooves and drilled openings, the grooves being for the purpose of connecting certain inlet and outlet passages brought in alignment therewith, and the drilled openings being for the purpose of releasing pressure from such outlets which it is not desired to hold under pressure, it being understood that the central opening 252 of the selector valve is connected with the sump. There are two main pressure conduits leading to the sleeve member 250 and connecting with the inlet openings thereof, i. e., conduit 253 leading from the pressure control valve and conduit 256, which is an extension of conduit 221, and brings the pressure directly from the accumulator cylinder 207. It is to be remembered that the inlet openings in the selector valve sleeve 250 (Fig. 4) are drilled through the sides of the sleeve member 250 substantially in a horizontal plane through the axis of said sleeve. As shown in Fig. 4 the conduit 253 leads to an annular groove 253a around the sleeve member 250, which groove has connecting slots 254 cut longitudinally of the sleeve, one of said slots being provided at each side of the sleeve member. From the slots 254 there are drilled openings 254a, 254b and 254c which are spaced as shown in Fig. 4 and extend into the center of the selector valve.

A similar construction is employed to effect inlets into the selector valve from the conduit 256, as shown at the right hand end of the sleeve 250 in Fig. 4, an annular groove 256a being provided around the selector valve sleeve 250, said annular groove connecting with grooves 257 on each side of the sleeve member. From the grooves 257 drilled openings 257a and 257b spaced as shown in Fig. 4 are provided. There have now been described two sources of pressure coming to the selector valve, each with a separate system of spaced inlet openings any one of which will supply fluid under pressure into the central bore of the selector valve cylinder if not closed by the surface of the selector valve.

A system of four outlet conduits, all of which take their pressure from the selector valve, is provided to direct the pressure to the two clutches and to the synchronizer operating unit. These conduits are shown in Figs. 3 and 4 as conduits 258 and 259 for clutch actuation, and conduits 273 and 274 for actuating the synchronizer unit. Each of these four conduits receives its pressure from conduits leading from the top and bottom of the selector valve sleeve member 250 by pairs of conduits shown in Fig. 5 as 279 and 280, with connecting drilled openings 279a and 280a. By inspection of Fig. 3 it is noted that the conduits 258, 259, 273, 274 are spaced along the selector valve cylinder, the clutch operating conduits 258 and 259 being located toward the left end, as shown in Fig. 3, and the synchronizing conduits 273 and 274 being adjacent the right hand end of the selector valve unit.

For the purpose of description of the selector valve unit it is here stated that conduit 258 carries pressure to actuate the clutch 11 for direct drive. The conduit 259 carries fluid under pressure to actuate the clutch 10 for effecting low and over-drive gear ratios, while the conduit 273 carries fluid under pressure to the left hand end of the synchronizer cylinder, shown in Fig. 4, for the purpose of moving the synchronizer operating shaft 303 from left to right and the conduit 278 carries fluid under pressure to the opposite or right hand end of the synchronizer cylinder to move the synchronizer in the opposite direction.

The connecting conduits which feed pressure to cylinder 32 (Fig. 1) to actuate the direct drive clutch 11 from conduit 258 are 251 (Fig. 3), 263 (Fig. 4), 266 (Figs. 1 and 4) and 267 (Fig. 1). The conduits which connect with 259 to feed pressure to cylinder 31 (Fig. 1) to actuate the low and over-drive clutch 10 are 262 (Fig. 3), 268 (Fig. 4), 269 (Figs. 1 and 4) and 271 (Fig. 1). For operating the synchronizer cylinder conduit 278 (Fig. 3) extends from conduit 274 and into the right hand end of the synchronizer cylinder through conduit 277 (Fig. 4a). Similarly, conduit 273, for feeding pressure to the opposite end of the synchronizer piston, has connecting conduit 275 (Fig. 3) which leads into conduit 276 (Fig. 4a).

The selector valve is shown in Figs. 3 and 4 in position to effect low speed drive of the transmission. A groove 291 extending around the outer periphery of the selector valve 251 connects the inlet conduit 254b (Fig. 4) with the outlet conduit 259 (Fig. 3) thereby feeding pressure to clutch 10. It is noted that the drilled inlet opening 254b is a restricted opening and that therefore the fluid under pressure is fed in such manner as to effect a slow engagement of the clutch 10. Referring to Fig. 3 it is noted that a drilled opening 292 is provided in the top and bottom of the selector valve cylinder which aligns itself with the conduit 258 leading to the direct drive clutch 11, and because of this alignment of the drilled opening 292 with the conduit 258 any pressure which may exist therein is released into the central opening 252 of the selector valve which is connected with the sump through suitable drilled openings.

As the speed of the car increases the selector valve is moved from right to left, as shown in Figs. 3 and 4, by the movement of the differential lever 287, and during the time which the low speed clutch has been engaged, as above described, a groove 294 of the selector valve has been aligned to feed pressure to the conduit 273 (Fig. 3), receiving such fluid under pressure from inlet opening 257b (Fig. 4). Also a drilled opening 296 (Fig. 3) has been aligned with conduit 274 to release pressure from said conduit and from the right hand end of the synchronizer operating cylinder. The result of this connection of the conduits 273 and 274 has moved the synchronizer unit to connect the gears 24 and 25 with the shaft 14 (Fig. 1), such connection of gearing being necessary to effect a low speed drive, as was previously described in connection with the general gear arrangement.

Continuing with the description of the effect of further increase in the speed of the car and the movement of the selector valve toward the left, as viewed in Figs. 3 and 4, a drilled opening 290 (Fig. 3) in the selector valve comes into alignment with the conduit 259 and releases the pressure therein through the restricted opening of said conduit 290, thereby producing a slow release of the low speed clutch. The same movement of the selector valve places the groove 291 in alignment with the conduit 258 for actuating the direct drive clutch, the pressure coming to the groove 291 from the unrestricted opening 254c (Fig. 4). The result of this movement has been to release the low speed clutch 10 and to actuate the direct drive clutch 11, a reversal of the condition previously existing. Subsequent movement of the selector valve toward the left after the above reversal of the clutches has been effected places a groove 295 in alignment with conduit 278 (Fig. 3), thus feeding pressure from the drilled opening 257b (Fig. 4) and placing drilled opening 296 (Fig. 3) in alignment to release pressure from conduit 273. The result of this movement of the selector valve is to feed pressure to the right hand end of the synchronizer operating cylinder 301 (Fig. 4) and release pressure from the left hand end of the cylinder, thereby producing movement of the synchronizer from right to left, as viewed in Fig. 4. It is noted that this movement is taking place during the time the direct drive clutch is in operation. This pressure flow continues until the synchronizer has been moved to its maximum left position (Fig. 1), thereby connecting the gear 17 with the shaft 14. No change in drive results with this movement since the clutch 10 is at this time disengaged. However, on further increase in car speed and further movement of the selector valve from right to left, as shown in Fig. 3, a longer annular groove 293 is brought into alignment with the conduit 259 (Fig. 3), thereby again actuating the clutch 10 to which the conduit 259 feeds pressure. Referring to Fig. 4, the pressure comes into the groove 293 when said groove bridges the two inlet drilled openings 254a and 254b, thereby effecting an unrestricted flow of fluid to actuate the clutch instead of the restricted flow afforded by 254b alone on the previous actuation of the clutch. It is understood that with the synchronizer in the maximum position toward the left, as above described, the gear ratio effected is an over-drive, as previously discussed with reference to the general gear arrangement.

(e) *Synchronizer, control cylinder and control parts*

As previously mentioned, the synchronizer is actuated for the purpose of changing the gear connection of one of the clutches while the other is engaged. In its general construction the synchronizer unit is similar to units used in other manually operated transmissions wherein the driver of the car changes the gear connection while the clutch is thrown out. The essential parts of such a unit are shown in Fig. 1 at 19 and comprise a sliding hub member which carries conical shaped surfaces which on sliding movement of the member will frictionally engage other conical surfaces on adjacent rotating parts, thus gradually bringing the two rotating parts up to the same speed of rotation, and after this is accomplished the shafts are permanently connected by movement of a collar which is provided in its inner circumference with toothed projections which are designed to fit with projections on the hub and on the adjacent rotating member thereby completing a positive connection. As shown in Fig. 1, the unit designed for use with the transmission has several novel features. A hub 401 mounted free to slide on shaft 14 and secured to rotate therewith has conical surfaces 402 and 403 provided adjacent its ends and has a sliding collar 404 which is normally held from axial movement relative to the hub 401 by a plurality of spring urged balls 405 which are pushed outwardly from the periphery of the hub 401 into a groove 406 in the inner surface of the collar. When the synchronizer collar is moved to the right or left, as shown in Fig. 1, by the action of the previously mentioned synchronizer fork, the conical surfaces 402 or 403 will contact adjacent surfaces on the gear members 18 or the gear 17 and by this frictional contact will bring these members up to the rotative speed of the synchronizer hub and shaft 14 before the connection is finally completed by the movement of the collar 404, which movement occurs when the force to shift the collar is sufficient to break the holding force of the spring connection effected by the balls 405. When this connection is broken the two rotating members are connected positively together by the intermeshing of the internal teeth on the inside of the collar 404 with teeth on the hub of gear 17 or on the hub of gear 18.

A greatly improved means of effecting frictional contact of the conical surfaces is provided, as shown in Fig. 1, by the use of a floating member 407 having two inner conical surfaces so that when the conical surface 402 of the hub 401 contacts one of these surfaces the member will slide along with the hub member and contact another surface on an adjacent floating member 408. In this manner a plurality of surfaces is provided and results in a greater frictional torque, thereby bringing members 18 and 401 to the same rotative speed in much less time than would be possible with a single frictional surface, provided the same pressure be applied in each case; or in the same time with less force. In case the same force be used to bring about synchronization in the same length of time, this construction which employs a plurality of successively engaged conical surfaces allows the use of a relatively large contacting angle and provides the same synchronizing power as with a single surface and smaller angle. The larger contacting angle is of advantage because cones of greater angle have less tendency to stick together after the pressure is removed, thereby leaving the members 18 and 401 free to turn slightly with respect to each other, after the holding force of the balls 405 has been broken, to permit the teeth on collar 404 and member 18 to engage.

In order that the synchronizer be properly operated by an automatic unit it is necessary that the actuating member be given a movement which is varying in its rate of speed, the necessary variation being a fast movement of the operating member during the approach or idle portion of its travel followed by a pause during the portion of the travel in which the synchronizing cones are being held in contact, followed by a fast movement for quickly effecting a positive connection by engagement of the projecting teeth or jaws on the inner surface of the collar with the adjacent gear unit.

For the purpose of effecting the above outlined result a fluid pressure operated synchronizer cylinder 301, see Fig. 4, is provided, the primary parts being the fluid pressure operated piston 302 with slidably mounted shaft 303 and shifter fork 304. The shifter fork 304 is connected with the synchronizer proper by the conventional circumferential recess 306. The connections of the fluid pressure system to this unit have previously been indicated up to the points 276 and 277 in Fig. 4a. In operation when, for example, the position of the selector valve is such as to require a movement of the synchronizer to the right to connect the lower gear ratio unit 18, the selector valve will allow fluid under pressure to enter through the opening 276 and pass out through the opening 277. A check valve is used at both of these openings which essentially comprises a star-shaped plate with a small orifice in its center mounted in both of the openings 276 and 277. When the flow of fluid under pressure is into the opening 276, for instance, the star-shaped plate 307 is caused to move upwardly off the opening 276 and allow unrestricted flow therethrough and the movement of the piston forces fluid out of the opening 277 and causes the star-shaped plate 307 in that opening to rest against the flat surface and restrict the flow therethrough. The result accomplished is an unrestricted inflow at one end of the cylinder and a restricted outflow at the other. It is noted that there are two other outlet ports 308 and 309 a distance from the ends of the synchronizer cylinder (see Fig. 4a). Considering the movement of the piston to the right, the port 309 during the first portion of the travel being uncovered by the piston allows substantially unrestricted outward flow, and, therefore, fast movement of the piston during the first part of the travel. However, as the piston covers the port 309 the piston moves more slowly as the flow is then restricted by the aforementioned star-shaped plate 307a.

A pause in the motion of the synchronizer during cone contact is assured by the manner of mounting the piston 302 upon the shaft 303. As shown in Fig. 4 the end of the shaft 303 projects into the recessed inner portion of the piston 302 and is yieldably secured to said piston by two springs 311 and 312, these springs being on opposite sides of an abutment 313 on the shaft 302. Suitable details to assure the reaction of the springs against this abutment are provided, namely, two rings 314 and 315 and a locating ring 316 in the piston. The spring connection above described permits the shifter fork and synchronizer to stop when the cones make contact. The piston 302, however, continues to move slowly during this period, its rate of motion being controlled by the star-shaped orifice 307 or 307a. The movement of piston 302 against spring 311 or 312 builds up a pressure which serves to press the conical surfaces of the synchronizer together for satisfactory frictional engagement to perform the function of bringing the new gear train to the same speed of rotation as member 401. The strength of the springs 311 and 312 and the size of the hole in the star-shaped orifice 307 or 307a are such that this pause continues a sufficient time so that synchronization is completed before enough pressure is built up on spring 311 or 312 to cause the shifter fork and shaft to disconnect the collar of the synchronizer. A final relatively faster movement of the synchronizer collar to effect final connection of the unit will result from the ensuing release of spring 311 or 312. This last movement may be better understood by reference to Fig. 1, wherein the sliding collar of the synchronizer is shown. Considering the synchronizer moving to the left it is apparent that the cones are brought into contact by movement of the entire synchronizer. During the time when the spring 311 is being compressed and until sufficient pressure is built up by the spring 311, the collar 404 and hub 401 of the synchronizer unit will not move longitudinally. After sufficient pressure is built up to break collar 404 away from the ball retainers, a fast movement will effect the final connection of the gear 17 to the shaft 14 by meshing of the internal teeth of the synchronizer collar 404 with the teeth on the gear member 17.

The synchronizer cylinder 302 as shown in Fig. 4a is constructed with an annular groove 302a and a drain 302b is provided in the wall of the synchronizer cylinder so that any leakage past the piston is drained back to the sump. In this way leakage of pressure past the piston is prevented from building up a back pressure on the outlet side thereby assuring that full inlet pressure will always be available to move the synchronizer piston. This construction was previously mentioned in connection with the diagrammatic showing in Fig. 2.

(f) *Synchronizer and selector valve interlock*

Still referring to Fig. 4, it is to be noted that there are two recesses 317 and 318 so positioned that when, for example, the movement of the synchronizer shifter fork 304 to the right is complete the recess 317 will come into alignment with a pin 319. This pin is mounted to have a beveled projecting end suitable for contacting a beveled ring 321 on the selector valve 251. During the time that the shifting has been taking place the end of the pin 319 has been in contact with the ring 321 and has prevented the movement of the selector valve, but on the completion of the shift the pin 319 drops into the recess 317 on coming into alignment therewith and the selector valve is released. In other words, the mechanism just described assures that the selector valve cannot move to apply clutch 10 until the synchronizer shift is completed, and collar 404 is in position to transmit the power applied through clutch 10. The action is similar when the synchronizer completes its movement to the left, pin 320 being brought into alignment with recess 318 thereby releasing the selector valve for movement toward the left with increase in speed.

(g) *Governor operated by vehicle speed*

Referring to Fig. 1, there is shown a governor mounted on the end of the shaft 14 at the rear of the transmission housing. The housing 350 for this governor unit is shown as bolted to the end of the main transmission housing and this housing also includes a bearing 351 and a speedometer drive gear 352 so mounted as to make possible the assembly of a conventional fitting 353 for connection to the propeller shaft of the vehicle. The governor itself is made up of a member 354 which is secured to rotate with the shaft 14. A plurality of bosses 356 project radially out from the fitting 354 and have pinned thereto counterweight arms 357. Similarly shaped counterweight arms 358 are secured to a sliding collar 359 mounted to slide upon the shaft 14. Weights 361 are mounted on the pins which connect the two counterwight arms 357 and 358 so that when the shaft 14 rotates carrying with it the member 354, the counterweights and arms and the collar 359, the speed of rotation causes the weights 361 to be thrown outward by centrifugal force. A spring 362 is mounted between the member 354 and the collar 359 and the centrifugal action of the weights 361 is therefore resisted by the spring 362 and therefore the location of the collar 359 on the shaft 14 is indicative of the speed of rotation of the shaft 14. It is also contemplated that a governor might be used employing a plurality of springs of differential effect designed to cause the valve mechanism to shift at suitable vehicle speeds, as disclosed in my co-pending application, Serial No. 715,065. In the design here shown the collar 359 has an annular recess 363 in which a suitable projection on a lever 364 is adapted to fit in such manner that when the collar 359 slides on the shaft 14 the lever 364 will be carried therewith (see Fig. 1). It is to be noted that an increase in speed of the shaft 14 causes the top end of the lever 364 to swing toward the left as shown in Fig. 1.

(h) *Controls from governor and throttle to differential lever*

As previously mentioned, the selector valve which directs the flow of fluid under pressure to the several mechanisms is controlled by the combined action of throttle control position and vehicle speed. A differential lever 287 shown in Fig. 3 is pivotally mounted at its center on the projecting end of the selector valve 251. One end 288 of this lever 287 (the lower end as viewed in Fig. 3) is actuated by the vehicle speed governor and the opposite end 289 is actuated by a member which moves with the throttle control, as will now be described.

To transfer the governor movement to the end of the differential lever 287 the mechanism shown in Figs. 1, 7 and 8 is provided. As shown in Fig. 7, the end of the lever 364 is connected by a rod 366 to a lever 367 projecting downwardly from a shaft 368 (see Figs. 1 and 8) which extends transversely across the top of the transmission. It will be apparent from inspection of Figs. 1, 7 and 8 and on consideration of the direction of the movement of the governor that clockwise rotation of shaft 368 as viewed in Fig. 1 would indicate increase in vehicle speed as reflected by the main shaft 14 of the transmission. Also referring to Fig. 6 wherein the shaft 368 is shown with a depending lever 369 secured thereto, it is noted that the end of the lever 369 is secured to the end of the differential lever 287, thereby completing the connection from the governor to the end of the differential lever, as shown at 288 in Figs. 3 and 6.

By appropriate linkages the engine throttle control is connected to rotate the shaft 371 shown in Fig. 3 in such a manner that clockwise rotation of the shaft 371 as viewed in Fig. 3 is indicative of increase in throttle opening. The shaft 371 is also shown in Fig. 6 and is secured to a lever 238 which is connected to the top end of the differential lever 287 by link 372. The lower extension of lever 238 also acts to apply the pressure control valve by contact with the projecting end 229. By the connection effected by the upper portion of lever 238 the throttle control is connected to the opposite end 289 of the differential lever 287 from that used to connect the governor control and makes possible the positioning of the selector valve by the combined action of throttle control position and vehicle speed. A spring 373 is mounted to hold the top end of the differential lever 287 normally toward the left (Fig. 3) and the opening action of the throttle rod is to move the lever in the opposite direction. There is also provided a spring 374 which serves to control the movement of the selector valve by contact with suitable projections on the projecting surface of the valve, thereby to define the steps in the movement thereof, as shown in the diagrammatic view Fig. 2.

In Figs. 3 and 6 there is shown a member 288a which is L shaped and is pivoted on the end of the shaft 371 and free to tilt about this pivot. The end of the member sets against the end of the pressure control valve 229, as shown in Fig. 3, and the projecting portion is so shaped that when the governor control at 288 is so positioned as to indicate a relatively high vehicle speed the end of the member 288 will hold the member 288a against the end of the pressure control valve and prevent it from entirely releasing the pressure, which would result whenever the throttle was released, regardless of the speed, if this stop were not provided. The throttle lever 238 has a projecting end which also controls the movement of the pressure control valve so that when the governor control member 288 is in a relatively low speed position, as shown in Fig. 3, small throttle openings will allow the pressure control valve to extend a maximum distance to the right, which condition will release all pressure and throw out any clutch which may be engaged, thereby producing a neutral (or free wheeling) condition, and permit the car to be stopped without stalling the engine. The above described mechanism allows such a condition to occur only at relatively low car speeds and released throttle, whereas at high car speeds the free wheeling of the car is prevented by the action of the member 288a which is held against the end of the pressure control valve.

(i) Reverse interlock

In order that it will not be possible for the automatic control of the transmission to throw the gearing into high gear when the manual shifting mechanism has been used to place the gears in position for a reverse drive, the mechanism shown in Figs. 8 and 9 has been provided. The shifter fork 28 shown in Fig. 8 is for the purpose of moving the reverse idler along the shaft 21 and as shown in Fig. 9 a two armed lever 450 is mounted with one of its arms 451 positioned to ride upon the top of the shifter fork arm 28 when said fork is in such longitudinal position as to effect reverse drive. Such a positioning of the lever as is shown in Fig. 9, produced when it is riding on top of the fork 28, positions the end 452 of the lever upwardly toward a projecting arm 453 secured to be rotated with the shaft 368 which it will be remembered is actuated by the vehicle speed governor and is connected through several leverages to actuate the selector valve. The result of the aforementioned positioning of the end 452 of the lever 450 is to place it in position to act as a stop so that the shaft 368, and therefore the selector valve, cannot be actuated to effect high gear. When the shifter fork is actuated to place the reverse idler out of operation by longitudinal movement of the fork 28 it is apparent that the lever 450 will drop by gravity out of the way and be positioned against a stop pin 454 snown in Fig. 9 and in such position will allow the shaft 368 and its connected parts to operate without interference.

(j) Clutch operating mechanism and support in transmission housing

In the design of the present type of transmission which includes the use of two so-called dry plate clutches mounted in a flywheel housing 12, shown in Fig. 1, combined with a fluid pressure mechanism to operate the dry plate clutches mounted adjacent thereto, it was a definite requirement that the use of an exceptionally heavy and cumbersome rotating weight suspended at the end of the flywheel housing be avoided. A heavy overhung weight, if no support were provided on the outer end, would be very objectionable as it would throw heavy loads on the end of the crankshaft and on the flywheel and clutch housing. There is another important problem in this connection in that it is very essential that none of the fluid which is used to actuate the fluid pressure mechanism can be allowed to be thrown from the rotating unit toward the clutches. Both of these problems have been considered and solved by the novel construction which is shown in Fig. 1. The entire overhanging portion of the fluid pressure actuating unit is supported in the large bearing 500 provided in the collector ring casing 460 which is secured to the transmission housing and serves both as a means to carry the collector ring conduits 266 and 269 as well as to provide a bearing for the rotating unit. It has been previously mentioned that all of the pistons for actuating the clutches rotate with the flywheel and such a construction is shown in Fig. 1. The piston housing 30 projects into the flywheel portion of the transmission housing and rotates with the flywheel but the entire unit is provided with a cup-shaped cover 461 with a flange edge 462 which extends back into the next compartment rearward of the flywheel casing. When the unit rotates this cup-shaped member collects such oil as may leak past the pistons, the centrifugal force causing this oil to flow back on the cup-shaped member to the flange 462 from which it is thrown on the adjacent wall of the stationary casing to flow into a sump groove 463, which groove is provided with a drain to allow the oil to flow back into the oil sump. This construction makes possible the use of the dry plate clutch actuated by a fluid pressure unit which rotates with the clutches but does not have the very objectionable feature of fluid conduits adjacent to it with the possibility of leakage into the clutches. As previously noted, the housing 30 is secured by set screws 30a to flywheel 12 and therefore endwise reaction from the pistons is transmitted to the flywheel and is not imposed on the bearings in the transmission or engine. The housing 30 is mounted with a limited lateral freedom of movement so that axial misalignment between the rotating flywheel clutch housing and the transmission unit will not seriously interfere with the cooperative operation of the housing 30 and the parts with which it rotates. This freedom of movement is made possible by a loose mounting of the collector ring casing 460 in the transmission case at 465 and also by a loose mounting of the projecting end of the housing 30 at 466 where it connects with the rotating flywheel 12. The right hand end of the housing 30 rotates in the collector ring casing 460 so that the said collector ring casing 460 and the housing 30 form a unit which, together with the sleeve 15, has a limited freedom of tilting movement because of the loose mounting, the end of the sleeve 15 being secured to the clutch plate and free to move on release of the clutch. By the above described mounting it has been found that such misalignment between the flywheel and the adjacent parts is adequately compensated so that a satisfactory mounting of the several rotating parts is accomplished without objectionable binding due to misalignment.

(k) Details of clutch construction to adapt for automatic operation

It is very advantageous in connection with a clutch which is to be actuated by fluid pressure mechanism that there be some kind of a cushioning means provided giving a delayed action so that when the fluid pressure is applied by whatever means is used to push the plates of the clutch together there will be a time interval after which the clutch will make positive engagement. It has been found after a considerable period of experimental work that the use of a clutch facing with a resilient mounting such as shown in Figs. 11 and 12 produces very desirable results. As shown in the two figures, one clutch facing 470 is secured to the clutch plate by rivets without resilient mounting, while the facing on the opposite side of the plate 472 has a plurality of spring clips 473 bent into the shape as shown and riveted at the center to the clutch facing and at one end to the plate. The result of such a construction is to resiliently mount the clutch facing relative to the plate so that when the clutch is engaged in the usual manner it will take up slowly because of the use of the resilient mounting.

Although I have described my invention as applied to a specific type of unit found practical in actual operation, I do not desire to limit myself to the exact details of the construction shown and described herein but rather to the scope of the following claims.

I claim:

1. In a transmission system for automobiles including a mechanism providing a plurality of driving connections of different speed mechanical advantage ratios, a clutch for transmitting power through one of said driving connections, a second clutch for transmitting power through another of said driving connections, and means for releasing one clutch and applying another to effect a change in ratio, including means to produce a different rate of release and application of said clutches when changing from a lower to a higher speed ratio than when changing from a higher to a lower speed ratio.

2. In a transmission having a plurality of clutches for effecting driving connections of high and low speed mechanical advantage ratios actuated by fluid under pressure characterized by a plurality of conduits, a selector valve for selectively directing fluid under pressure to and from said conduits to effect high and low speed ratios through said clutches, certain of said conduits leading to one of said clutches having restricted passages of different area for feeding pressure thereto, and means for automatically rendering a passage of lesser area effective during a shift from a higher to a lower speed ratio than when shifting from a lower to a higher ratio whereby said clutches are applied more slowly when shifting into lower ratios.

3. In a transmission for automobiles of the type wherein gear ratio changes are accomplished by releasing one clutch and applying another, characterized by fluid pressure means for regulating the actuation of the clutches, and automatic means for altering the rate of actuation by rendering a passage of lesser area effective during a shift from a higher to a lower speed ratio than when shifting from a lower to a higher speed ratio.

4. In a fluid pressure operated automatic transmission, a selector valve for directing fluid pressure to actuate said transmission for various gear ratios, automatic means for positioning said selector valve and manually operated mechanism for positioning said valve when desired, means combined with said manually operated mechanism for providing a slower operation of said fluid pressure mechanism when said manually operated mechanism is operated, said means comprising a branched conduit having an unrestricted opening in one of said branches and a restricted opening in the other of said branches, a valve member operable with said manually actuated mechanism for closing said unrestricted branch thereby forcing said fluid under pressure to flow through said branch having a restricted opening therein.

5. In a transmission for automobiles of the type wherein gear ratio changes are accomplished by releasing one clutch and applying another, characterized by means for regulating the actuation of the clutches, and automatic means for altering the rate of actuation in such manner as to allow more time between the clutch release and engagement when increasing the gear ratio than when decreasing it.

6. In a power transmission system for automobiles, an engine, a fluid pressure operated clutch, a plurality of gear trains, gear train shifting means for variously connecting said gear trains to provide a variation in gear ratio, a valve for directing fluid pressure for applying and releasing said clutch to connect said gear trains for operation by said engine, and positive interlocking means for preventing the valve from applying the clutch before said gear train shifting means has completed its connection.

7. In a fluid pressure operated transmission having a plurality of clutches controlling independent driving connections, mechanism for varying the mechanical advantage ratio of one or more of said driving connections, a source of fluid pressure, a selector valve for directing fluid under pressure to successively operate said clutches, and positive interlocking means for preventing movement of said selector valve before said mechanism for varying the ratio has completed a shifting movement.

8. In a fluid pressure operated transmission having a clutch for effecting a drive through a gear train providing a plurality of gear ratios, means for changing the gear ratio transmitted through said gear train, and positive interlocking means for preventing the application of said clutch until the gear ratio changing means has completed its operation.

9. A fluid pressure operated transmission for an automobile, comprising a plurality of fluid pressure operated clutches, an engine, driving connections of different gear ratios controlled by said clutches, means for automatically actuating said clutches to make said different gear ratios effective including means for operating said clutches in such timed relationship that there will be overlapped engagement between two clutches when a gear change of said transmission is being effected from a lower to a higher ratio to prevent racing of said engine, and means for insuring complete disengagement of all of said clutches when said transmission is automatically operated to effect a gear change from a higher to a lower ratio.

10. In a variable speed power transmission system having a driving member and a driven member and a plurality of means for providing different speed ratios between said members comprising, a clutch connecting the driving and driven members through either of two speed ratios, a second clutch connecting the driving and driven members through another speed ratio, a third clutch for selecting one of the said speed ratios connected through said first mentioned clutch, and positive interlocking means interposed between said first mentioned clutch and said third clutch to prevent engagement of said first clutch until engagement of said third clutch is completed.

11. In a variable speed power transmission system, a driving member and a driven member, a plurality of driving connections, a plurality of primary clutches for selectively connecting said driving connections to effect a drive between said driving and driven members, secondary clutch means associated with one of said driving connections for varying the ratio thereof, a control member for actuating said primary and secondary clutches, and an interlocking member between said secondary clutch and the primary clutch connected therewith to hold said primary clutch from engagement when said secondary clutch is disconnected.

12. In a fluid pressure mechanism for automatic operation of a transmission comprising a plurality of primary clutches operable to selectively connect a plurality of driving connections of different gear ratios for operation, secondary clutch means for varying the gear ratio of one of said driving connections, an interlock between the said secondary clutch and the primary clutch connected therewith positioned to prevent engagement of said primary clutch when said secondary clutch is disconnected, fluid pressure operated units for actuating each of said primary and secondary clutches, and a selector valve for directing fluid under pressure to said units thereby to actuate said primary and secondary clutches in timed relation with each other.

13. In a transmission, a main driving shaft extending therethrough for connecting with the driving wheels of a vehicle, a flywheel rotating with the power plant of said vehicle, a clutch operable to connect said flywheel with said driving shaft, a sleeve surrounding said driving shaft and rotatable to drive a gear train providing a gear ratio between said sleeve and said driving shaft, a clutch operable to connect said flywheel with said sleeve, a second gear train, independent clutch means for connecting said second gear train in combination with said first mentioned gear train to vary the ratio between said sleeve and said driving shaft, an interlock between said independent clutch means and said second mentioned clutch positioned to prevent engagement of said second mentioned clutch when said independent clutch means is disconnected, and control mechanism for operating said three clutches in timed relation whereby said transmission is operable to provide a starting speed by operation of said second mentioned clutch, a direct drive by operation of said first mentioned clutch, and a third speed by a second actuation of said second mentioned clutch following actuation of said independent clutch means.

14. In a transmission for automotive vehicles, a gear train operable to provide a gear ratio satisfactory for starting said vehicle, a clutch for connecting said gear train to the power plant of said vehicle, a driving shaft connecting said transmission with the wheels of said vehicle, a clutch operable to connect said power plant directly with said shaft, independent clutch means for varying the ratio of said gear train, an interlock between said independent clutch means and said first mentioned clutch positioned to prevent engagement of said first mentioned clutch when said independent clutch means is disconnected, whereby on operation of said first mentioned clutch said gear train can be used for starting said vehicle and said second mentioned clutch operated to effect direct drive on release of said first mentioned clutch and subsequently said independent clutch operated to change the ratio of said gear train while said direct drive clutch is in operation whereby a gear train of modified ratio is available when said first mentioned clutch is again actuated and said second mentioned clutch is released.

15. In a transmission, a main driving shaft, a counter-shaft, a sleeve mounted for rotation around said main driving shaft, a rotating member of the power plant positioned in the forward end of said transmission, a pair of independent gears rotatable on said driving shaft and synchronizer clutch means for connecting either of said gears to said driving shaft, a gear train connecting said sleeve with one of said pair of gears and a second gear train connecting said sleeve with the other of said pair of gears, a clutch operable to connect said driving shaft directly with said rotating power plant member, a second clutch operable to connect said sleeve with said power plant member, an interlock between said synchronizer clutch means and said second clutch positioned to prevent engagement of said second clutch when said synchronizer clutch is disconnected, to provide direct drive or two speeds of different gear ratio.

16. In a fluid pressure mechanism for automatically operating a transmission having a plurality of gear ratio units, a selector valve for successively directing fluid under pressure to actuate said units comprising a plurality of conduits, one for each of the said gear ratio units, said selector valve having some of said conduits of more restricted area opening than others in such a relation that when said openings are placed in position on operation of said valve to direct fluid to actuate said gear ratio units a different rate of connection and release of said units will result when changing from a lower to a higher ratio than when changing from a higher to a lower ratio.

17. In a power transmission system for automobiles, a plurality of gear trains providing various gear ratios, friction clutch means for making each gear ratio effective, means for successively operating said clutch means including means for separately regulating the rate of actuation and release of said friction clutch means for one of said gear ratios independently of the others comprising a selector valve for successively directing fluid under pressure to actuate said friction clutch means having a plurality of conduits, one for each of said friction clutch means, said selector valve having some of said conduits of more restricted area opening than others in such a relation that when said openings are placed in position on operation of said valve to direct fluid to actuate said friction clutch means a different rate of connection and release of said friction clutch means will result when changing from a lower to a higher ratio than when changing from a higher to a lower ratio.

18. In a fluid pressure operated automatic transmission, a selector valve for directing fluid under pressure to actuate said transmission for various gear ratios, means combined with said selector valve for providing slower operation of said fluid pressure mechanism, said means comprising a branched conduit having an unrestricted opening in one of said branches and a restricted opening in the other of said branches, a valve member operable for closing said unrestricted branch thereby forcing said fluid under pressure to flow through said branch having a restricted opening therein.

19. In a fluid pressure operated automatic transmission, a selector valve for directing fluid pressure to actuate said transmission for various gear ratios, means for positioning the said selector valve comprsing a governor responsive to vehicle speed, means combined with said governor for providing a slower operation of said fluid pressure mechanism at higher vehicle speed, said means comprising a branched conduit having an unrestricted opening in one of said branches and a restricted opening in the other said branches, a valve member operable with said governor for closing said unrestricted branch at higher speeds thereby forcing said fluid under pressure to flow through said branch having a restricted opening therein.

20. In a fluid pressure operated automatic transmission, a selector valve for directing fluid pressure to actuate said transmission for various gear ratios, means combined with said selector valve providing variation in the rate of actuation of said fluid pressure mechansm with changing temperature, said means comprising, a thermostatic element, a branched conduit having an unrestricted opening in one of said branches and a restricted opening in the other of said branches, a valve member operable by said thermostatic element for closing said unrestricted branch thereby forcing said fluid under pressure to flow through said branch having a restricted opening therein at predetermined temperature ranges.

21. In a fluid pressure operated transmission system for automobiles, an engine, a pair of fluid pressure operated clutches, a plurality of gear trains operated by each of said clutches, gear train shifting means for variously connecting said gear trains to provide a variation in gear ratio, a valve for directing fluid pressure for applying and releasing said clutches to connect said gear trains for operation by said engine, and positive interlocking means interposed between said gear train shifting means and said valve for preventing the valve from applying either of said clutches before said gear train shifting means has completed its connection.

22. In a fluid pressure operated transmission having a plurality of clutches controlling independent driving connections, mechanism for varying the mechanical advantage of one or more of said driving connections, a source of fluid pressure, a selector valve for directing fluid under pressure to successively operate said clutches, and positive interlocking means interposed between said valve and said mechanism for preventing movement of said selector valve before said mechanism for varying the ratio has completed a shifting movement.

23. In a variable speed power transmission system, a driving member and a driven member, a plurality of driving connections, a plurality of primary clutches for selectively connecting said driving connections to effect a drive between said driving and driven members, secondary clutch means associated with one of said driving connections for varyng the ratio thereof, a control member for governing the actuation of said primary and secondary clutches, and an interlocking member interposed between control member and said secondary clutch means for preventing, when said secondary clutch means is disengaged, such movement of said control member as would cause said primary clutch to engage.

24. In a fluid pressure mechanism for automatic operation of a transmission comprising a plurality of primary clutches operable to selectively connect a plurality of driving connections of different gear ratios for operation, secondary clutch means for varying the gear ratio of one of said driving connections, fluid pressure operated units for actuating each of said primary clutches and said secondary clutch means, a selector valve for directing fluid under pressure to said units, and an interlock between said selector valve and said secondary clutch means to prevent engagement of said primary clutches when said secondary clutch means is disconnected.

WM. T. LIVERMORE.